UNITED STATES PATENT OFFICE.

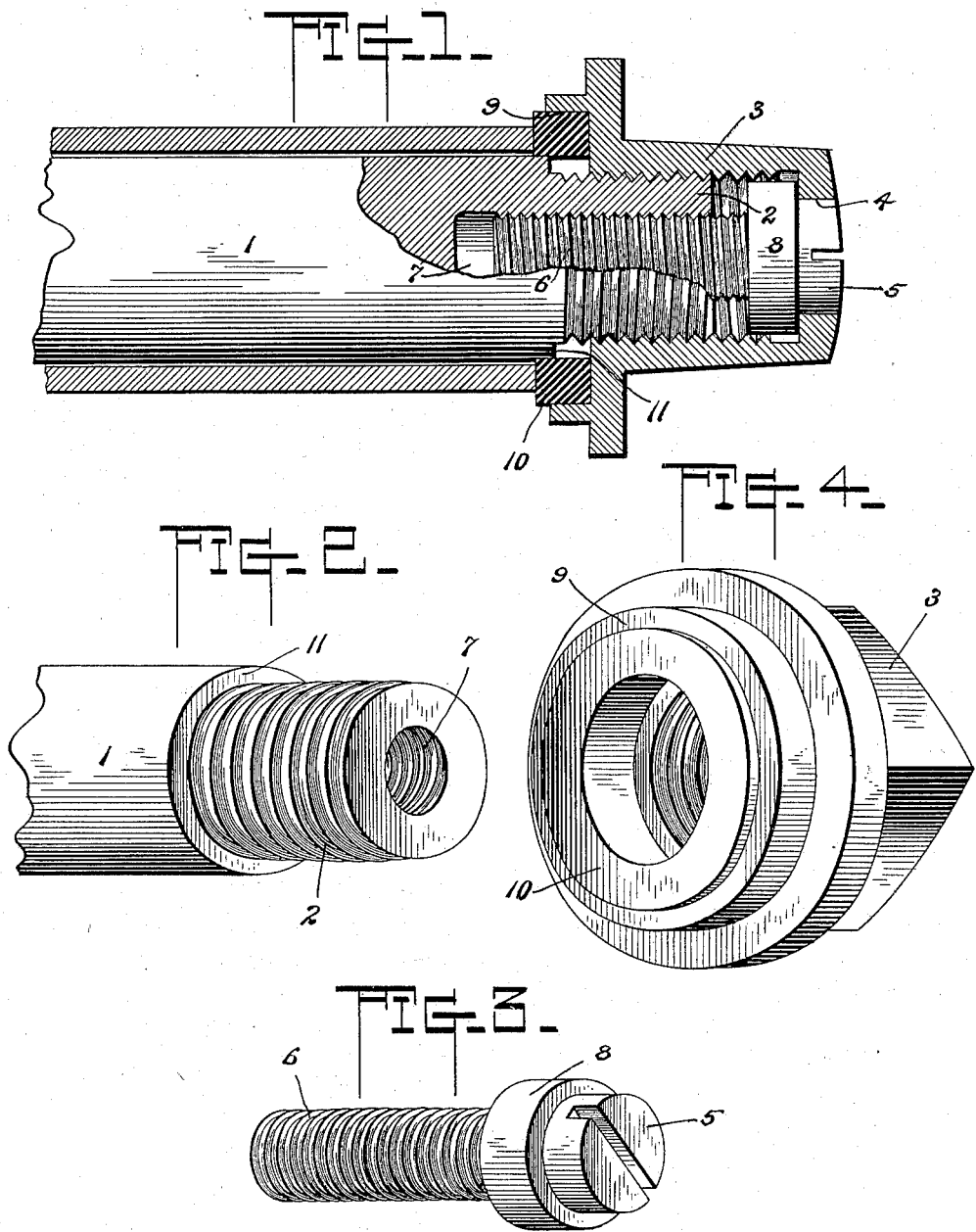

WILLIAM F. SCHLABACH, OF WADSWORTH, OHIO.

NUT-LOCK.

SPECIFICATION forming part of Letters Patent No. 589,984, dated September 14, 1897.

Application filed September 5, 1896. Serial No. 605,025. (No model.)

*To all whom it may concern:*

Be it known that I, WILLIAM F. SCHLABACH, a citizen of the United States, residing at Wadsworth, in the county of Medina and State of Ohio, have invented a new and useful Nut-Lock, of which the following is a specification.

This invention relates to nut-locks, and the object in view is to provide, in connection with a bolt or axle spindle and nut, means whereby the nut may be adjusted to any desired position on the bolt or spindle and held fast, preventing its accidental backing or loosening. The device, while specially applicable to spindles of wagons, carriages, and other vehicles, may be applied at any point and in any place where it is important to keep a nut from working loose.

To this end the invention consists in an improved nut-lock embodying certain novel features and details of construction and arrangement of parts, as hereinafter particularly described, illustrated in the drawings, and incorporated in the claim.

In the accompanying drawings, Figure 1 is a longitudinal sectional view showing the improved nut-lock applied to the spindle of a vehicle. Fig. 2 is a detail perspective view of the outer end of the spindle. Fig. 3 is a detail perspective view of the locking-screw. Fig. 4 is a similar view of the nut.

Similar numerals of reference designate corresponding parts in the several figures of the drawings.

The improved nut-lock, as stated, may be utilized in any place where it is desirable to prevent a nut from working loose, but for the purpose of illustrating the invention the same has been shown as applied to the axle-spindle of an ordinary vehicle, 1 designating such spindle, and 2 the reduced and threaded end of the spindle which receives the nut 3 for securing the wheel on the spindle.

For the purpose of carrying out the present invention a round hole 4 is drilled through the end of the nut 3, the same being sufficiently large to receive and include the head 5 of a locking-screw 6. A bore or socket 7 is formed in the end of the spindle and the same is threaded to receive and engage the threaded screw 6, said screw having a right-hand thread where the spindle has a left-hand thread, or vice versa. Adjacent to the head 5 of the locking-screw 6 the latter is provided with a fixed collar or circumferential flange 8, which is larger in diameter than the hole 4 in the nut, but of less diameter than the threaded opening of the nut, thus forming an annular shoulder on the locking-screw, which is adapted to bear firmly against the inner surface of the end wall of the nut when the parts are properly adjusted, but to be entirely out of engagement with the threaded interior of the nut, thus permitting the nut and screw to be adjusted without any engagement between them until their locking position is reached. Upon its inner face the nut 3 is provided with an inwardly-projecting annular flange 9, within which is arranged a packing-ring or washer 10, for giving close contact between the nut and wheel-hub.

In the application and adjustment of the device the locking-screw is first inserted in its threaded socket in the end of the spindle. The nut is now applied to the spindle and turned in an opposite direction from that in which the locking-screw was turned, until said nut is brought to the desired point for engaging the wheel-hub. By means of a screw-driver the locking-screw 6 is now backed until its collar or flange 8, forming the annular shoulder above referred to, is brought to bear tightly against the inner surface of the outer wall of the nut, as clearly shown in Fig. 1. Under this arrangement any tendency of the nut to loosen is counteracted by the locking-screw which, as it must rotate in an opposite direction, binds the more firmly against the nut and prevents the working loose of the latter. It will be seen that there need be no projection beyond the outer end of the nut, as the head of the locking-screw may be made perfectly flush therewith, and also that no dirt or other foreign matter can get inside of the nut by reason of the collar or flange 8 bearing closely against the inside of the nut. The nut may be either a right or left hand threaded one, and in either event a reverse thread is formed on the locking-screw. The object in locking the nut at any point on the spindle is to provide for a greater or less thickness of packing-ring or washer and to take up wear, also to prevent lost motion, thereby reducing the liability of the parts to become overheated.

It will be apparent that the device is susceptible of changes in the form, proportion, and minor details of construction, which may accordingly be resorted to without departing from the spirit or sacrificing any of the advantages of this invention.

Having thus described the invention, what is claimed as new is—

The combination with an exteriorly-threaded part provided with a longitudinal bore extending inwardly from its end, said bore being threaded oppositely to the exterior thread, of a threaded locking-screw working in said threaded bore and provided with an annular shoulder intermediate its head and the thread of its shank, said shoulder being of less diameter than the said threaded part, and an internally-threaded nut screwing upon the said exteriorly-threaded part and provided with a reduced opening in its end wall adapted to receive the head of the locking-screw and the annular shoulder on the said screw being adapted to engage the inner face of the end wall, the construction being such that the screw will lock the nut in place and the latter may be removed from the threaded part without engaging with the locking-screw, substantially as described.

In testimony that I claim the foregoing as my own I have hereto affixed my signature in the presence of two witnesses.

WILLIAM F. SCHLABACH.

Witnesses:
DON A. PARDEE, Jr.,
AARON PARDEE.